US008876454B2

(12) United States Patent  
Koholka (10) Patent No.: US 8,876,454 B2  
(45) Date of Patent: Nov. 4, 2014

(54) STORAGE SYSTEM (75) Inventor: Roland Koholka, Lannach (AT)

(73) Assignee: Knapp AG, Hart (AT)

( * ) Notice: Subject to any disclaimer, the term of this patent is extended or adjusted under 35 U.S.C. 154(b) by 324 days.

(21) Appl. No.: 13/390,730

(22) PCT Filed: Aug. 17, 2010

(86) PCT No.: PCT/EP2010/061990  
§ 371 (c)(1),  
(2), (4) Date: May 4, 2012

(87) PCT Pub. No.: WO2011/020836  
PCT Pub. Date: Feb. 24, 2011

(65) Prior Publication Data  
US 2012/0207567 A1    Aug. 16, 2012

(30) Foreign Application Priority Data

Aug. 17, 2009  (AT) .................................. A 1293/2009

(51) Int. Cl.  
*B65G 1/04* (2006.01)  
*B65G 1/137* (2006.01)

(52) U.S. Cl.  
CPC ............ *B65G 1/1378* (2013.01); *B65G 1/0485* (2013.01)  
USPC ...................... 414/277; 414/278; 414/331.01

(58) Field of Classification Search  
USPC ........ 414/277, 278, 279, 268, 331.01, 331.03  
See application file for complete search history.

(56) References Cited

U.S. PATENT DOCUMENTS

| 5,002,449 | A | 3/1991 | Kita et al. | |
|---|---|---|---|---|
| 5,599,154 | A * | 2/1997 | Holscher et al. | 414/278 |
| 6,923,612 | B2 * | 8/2005 | Hansl | 414/277 |
| 2003/0228208 | A1* | 12/2003 | Grond | 414/267 |
| 2006/0285947 | A1* | 12/2006 | Hansl et al. | 414/277 |
| 2010/0322748 | A1* | 12/2010 | Lee | 414/281 |
| 2011/0008138 | A1* | 1/2011 | Yamashita | 414/277 |
| 2012/0177465 | A1* | 7/2012 | Koholka | 414/279 |
| 2013/0129456 | A1* | 5/2013 | Salichs et al. | 414/279 |

FOREIGN PATENT DOCUMENTS

| DE | 93 15 118 U1 | 2/1994 |
|---|---|---|
| DE | 10 2008 007 826 A1 | 8/2009 |

(Continued)

*Primary Examiner* — Kaitlin Joerger  
(74) *Attorney, Agent, or Firm* — Dickstein Shapiro LLP (57) ABSTRACT

In a storage system (1; 18) with at least one shelving level (3, 4, 5, 6, 7), comprising at least one transport aisle (10), shelves (8, 9; 19, 20) situated alongside the transport aisle (10) with storage spaces (L) for products (P) and a level transport device (EBG) movable in the transport aisle (10) for approaching the storage spaces (L), with a conveyor system (2; 24) for supplying products (P) to the shelving level (3, 4, 5, 6, 7) and removing therefrom, with at least one intermediate buffer (Z), in which the products (P) supplied by means of the conveyor system (2; 24) are temporarily stored until their storage in a storage space (L) and in which products (P) that are removed from the storage places (L) are temporarily stored until their transfer to the conveyor system (2; 24), there is provided that substantially each storage space (L) has a movable compartment floor (F) and that the level transport device (EBG) has compartment floor-moving means, by means of which a compartment floor (F) may be transferred from the storage space (L) into the level transport device (EBG) and vice versa and from the level transport device (EBG) into the intermediate buffer (Z) and vice versa so that the compartment floor (F) does not pass onto the conveyor system (2; 24).

19 Claims, 9 Drawing Sheets

(56) References Cited

FOREIGN PATENT DOCUMENTS

| | | |
|---|---|---|
| DE | 20 2009 012 490 U1 | 2/2010 |
| EP | 0 678 461 A1 | 10/1995 |
| EP | 1 262 430 A2 | 12/2002 |
| EP | 1 462 393 A1 | 9/2004 |
| GB | 1051879 A | 12/1966 |
| WO | WO 01/27002 A1 | 4/2001 |
| WO | WO 2008/015114 A2 | 2/2008 |

* cited by examiner

STORAGE SYSTEM

In many logistics systems, for example in the food and textile sector, there is often stipulated the demand of the temporary storage of products of most different dimensions, shapes and levels of rigidness for a subsequent commissioning process or for the direct dispatch thereof.

In order to save time and money, there are set steadily increasing requirements for logistics systems in terms of the degree of automation. It has been known to store "fast moving" products, this is, products that are available in a great number and in the same shape, in a high-bay storage and to use automated and computer-controlled shelf vehicles for the process of placing into storage as well as removing therefrom. It is decisive for the performance of the entire system that the commissioning process, wherein the goods are collected for an order of delivery, may be carried out quickly and with a high level of automation or that directly to be dispatched products are quickly moved to a dispatch site with a high level of automation. The automation of the process of placing in storage and commissioning or dispatching, respectively, goods of different dimensions, shapes and levels of rigidity encounters a great amount of difficulties due to the diversity of these products and their different way of handling. There have already been developed automated small parts storages in order to solve these problems. Herein, the term "small" parts storage does not refer to the size of the products but rather to their quantities and throughput. These products are, for example, units that are considered for storing and commissioning as packing units not further divisible anymore, which may, however, consist of several individual parts, e.g., multiple packages of PET bottles, which are surrounded by a shrink film. In order to provide for the storage of these product units in the small parts storage, there are most commonly used storage aid means, so-called trays.

An example of such an automated small parts storage is known from the publication EP 1 698 573 B1, which discloses an automated system for storing and commissioning products. This system comprises a tray storage, in which the products are stored on trays after being removed from pallets, being individualized and placed on these trays. For commissioning, the trays are then moved with the products situated thereupon to the commissioning working stations. Removing the products from the tray at these work stations may be carried out in an automated or manual way.

Using trays, however, has the disadvantage that following the removal of the products, the empty trays have to be transferred into a tray storage by means of a return conveyor and stored there until they are needed for picking up new products. The storage of these trays may be carried out directly in the automated small parts storage, which, however, has adverse effects on the system and reduces the performance to be utilized, this is the storage and removal of trays with products situated thereon. This performance decrease is especially disadvantageous in automated small parts storage, as the removal performance of the automated small parts storage in many cases constitutes the factor that limits the throughput of the entire system.

One possibility of storing the empty trays, without exerting negative effects on the automated small parts storage, is the storage of the trays outside of the storage. This, however, leads to additional costs due to the generation of necessary conveyor system, stapling and destapling devices. Another disadvantage of such systems is the costs amounting per tray.

In regard to the above disadvantages of the state of the art, there have been existent approaches to store the products without trays in automated small parts storage systems. For this reason, there are used shelf control devices with complex means for picking up loads. Shelf control devices, however, are often too slow for many applications in the field of commissioning and for the direct dispatch. Furthermore, the development of means for picking up loads, which are suitable for the most diverse products, is extremely difficult.

Hence, it is the object of the present invention to provide for the storage of the most diverse, conveyable products in an automated small parts storage system and for the removal of the products from the automated small parts storage without using trays or shelf control devices and, in this connection, obtain high processing rates.

This object is solved by a storage system with the features of claim 1 as well as by a method for placing in storage and removing products in a storage system with the features of claim 14. Advantageous embodiments of the invention are illustrated in the sub-claims.

In the following, embodiments of the invention are explained in greater detail in a not-limiting way in reference to the drawings.

In the FIGS. 5-A to 5-R there is depicted a storage system according to a further exemplary embodiment of the invention in a schematic illustration, wherein the individual process steps for placing in storage and removing a product are visible.

Figure 1:
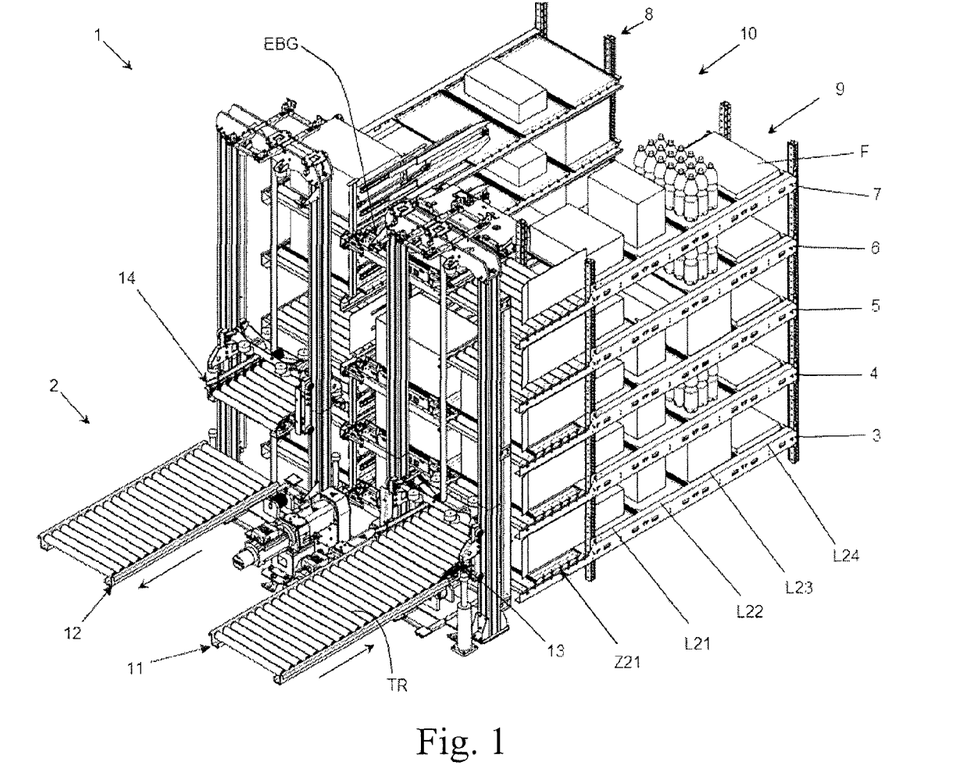
FIG. 1 shows a storage system with five levels in an oblique view.
Figure 2:
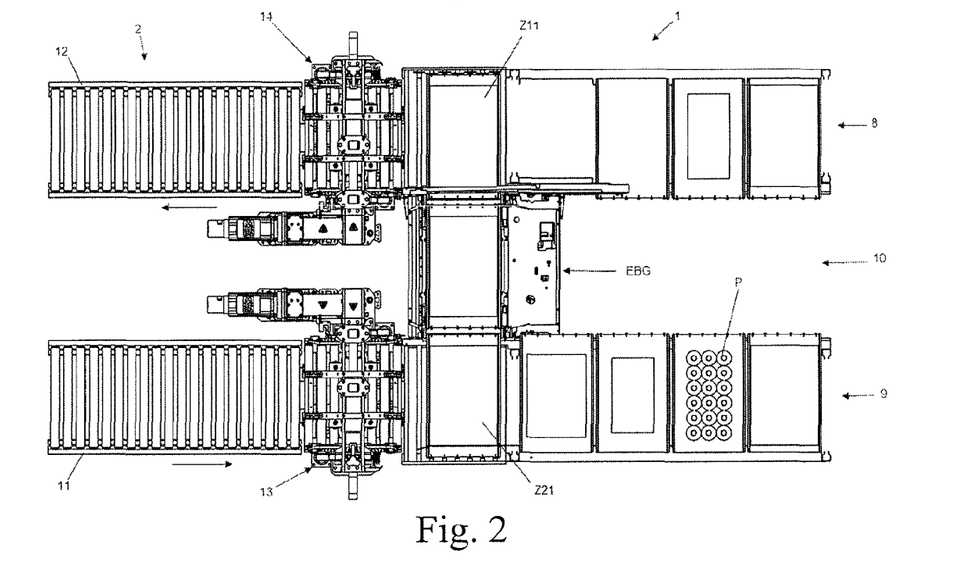
FIG. 2 shows the storage system according to FIG. 1 in a top view.
Figure 3:
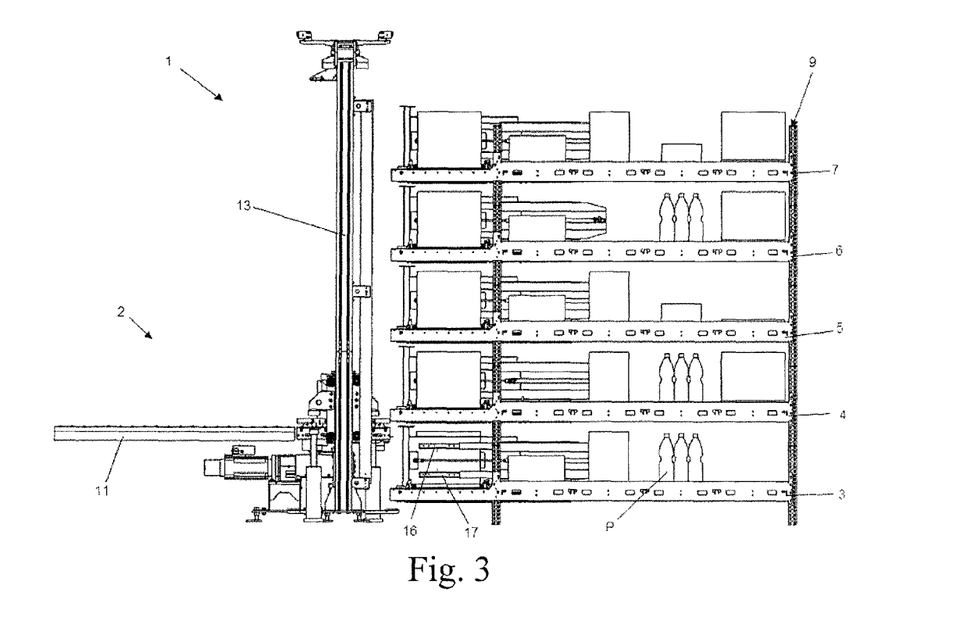
FIG. 3 shows the storage system according to FIG. 1 in a side view.

In the FIGS. 1 to 3 there is depicted a storage system 1, in which the products P may be temporarily stored. The products P are delivered by trailer trucks or by train and from there are loaded into a palette storage not depicted in the figures. On a palette, there may be stored a great number of one type of the products P, wherein a package unit that cannot be further divided is designated in the following as a product P. For example, six PET plastic bottles that are packed together in plastic foil may constitute a product P.

The products P are unloaded from the palettes and herein individualized and conveyed via a conveyor system 2, depicted in part in the figures, to the storage system 1. In the storage system 1, the products P are temporarily stored and then supplied via the conveyor system 2 to a commissioning unit, if a certain amount of different products P is to be supplied to a customer. The arrangement of the different products P according to number and type on one or several palettes for delivery via trailer truck or train is designated as commissioning of the products P. A system computer not depicted in the figures is provided for the entire control of the conveyor system 2 and also of the storage system 1.

The storage system 1 depicted in the FIGS. 1 to 3 has five shelving levels 3, 4, 5, 6 and 7 of a first shelf 8 and a second shelf 9. The two shelves 8 and 9 each have four storage spaces L in each of the shelving levels 3, 4, 5, 6 or 7, wherein the storage spaces are, for example, designated as L21, L22, L23 and L24 of the second shelf 9 in the first shelving level 3 in FIG. 1. On each of the storage spaces L, there is situated a compartment floor F for the transport of the products P, which will be explained in greater detail in the following.

Between the first shelf 8 and the second shelf 9, there is situated a transport aisle 10, in which there is provided a level transport device EBG per level for approaching the storage spaces L in the different levels, which will be explained in greater detail by way of FIG. 5. The products P are conveyed from the palette storage via an import section 11 of the conveyor system 1 to the storage system 1 and via an export section 12 of the conveyor system 2 from the storage system 1 to the commissioning unit. In order to facilitate transport, the products P are moved across transport rolls TR of the import section 11 and the export section 12. The storage system 1 has a first lift 13 and a second lift 14. The first lift 13 is designed for picking up products P supplied via the import section 11 and for delivering or lifting, respectively, the products P onto the shelving level determined by the system computer and for loading the products P into an intermediate buffer Z provided in each shelf of each shelf 8 and 9. The intermediate buffers Z are designed for short-term temporary storage of products P unloaded by the first lift 13 until storage in a storage space L and for temporary storage of products P removed from storage spaces L until transfer to the second lift 14. In FIG. 1 there is, for example, designated the intermediate buffer Z21 of the second shelf 9 in the first shelving level 1. As the products P have been supplied via the import section 11 to the storage system 1, the intermediate buffers Z21 to Z25 of the five shelving levels 3 to 7 of the second shelf 9 are provided for a temporary storage in the storage process. As, furthermore, the export section 12 moves the products P out of the storage system 1, the intermediate buffers Z11 to Z15 of the shelving levels 3 to 7 of the first shelf 8 are provided for temporary storage during removal. Due to this clear assignment of the intermediate storages Z, there is obtained the advantage of a high throughput of the storage system 1.

In the storage system 1 there is now provided that each storage space L has a movable compartment floor F. The products P are placed on the compartment floor F when being introduced into the intermediate storage Z, and the level transport device EBG has means for moving shelves, by means of which a compartment floor F may be transferred from the storage space L into the level transport device EBG and vice versa as well as from the level transport device EBG into the intermediate storage Z and vice versa. For this reason, the means for moving compartment floors F orm an integral connection that is not depicted in greater detail in the figures with a compartment floor F transported by the level transport device EBG. The assignment of each one of the compartment floors F to each one of the storage spaces L and the determination that the compartment floor will not leave the respective level of the storage system 1 and, hence, will not pass onto the second lift 14 as well as the conveyor system 2 provide the advantage that there are not to be returned any empty compartment floors F following the unloading in the commissioning unit and, hence, the conveyor system 2 and the first lift 13 will not be adversely effected, thus guaranteeing a high throughput of the storage system 1. There is further not necessary an intermediate storage for empty compartment floors F, as every compartment floor F is assigned to one storage space L of the storage system 1 and as this compartment floor F is either situated on the storage space L assigned or on the level transport device EBG or the intermediate storage Z. This will be explained in greater detail by way of the FIG. 5.

Figure 4:
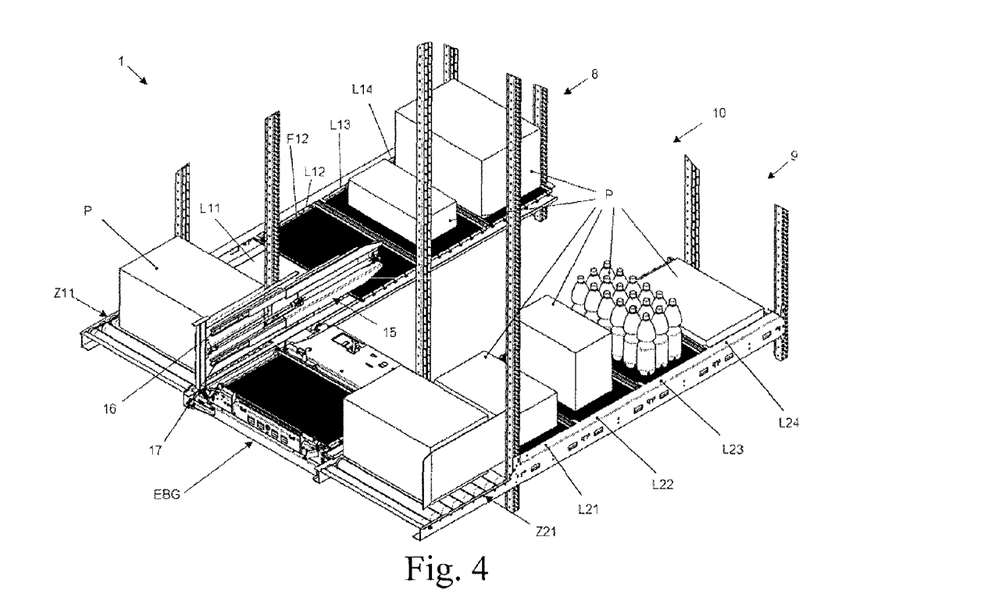
FIG. 4 shows the first level of the storage system according to FIG. 1 in an oblique view.

In FIG. 4 there is depicted the first level 3 of the first shelf 8 and the second shelf 9 including the level transport device EBG of the first level 3 in an oblique view. The products P are stored on the compartment floors F of the storage spaces L21 to L24 of the second shelf 9 and on the storage spaces L13 and L14 of the first shelf 8, which are illustrated as black areas. On storage space L12 there is only stored the associated compartment floor F12, which is why the storage space L12 would be free for storing a product P. In FIG. 4, there is no compartment floor F11 on the storage space L11, as this storage space L11 is not used, which will be explained in greater detail in the following. The level transport device EBG is driven by a motor and moves in the transport aisle 10, controlled by the system computer, for transporting the compartment floors F and the products P situated on the compartment floors F.

The intermediate buffer Z11 intended for removing the products P has a product stripping device 15, by means of which the product P that is situated on the compartment floor F is retained by means of slide elements 16 and 17 during the transport of the compartment floor F from the intermediate storage Z11 onto the level transport device EBG in the intermediate storage Z11 and, hence, stripped of the compartment floor F. Thereafter, the level transport device EBG transports the compartment floor F back to the storage space L assigned to the compartment floor F, and the product P is then pushed from the intermediate storage Z11 into the lift 14, once this is ready to convey the product P onto the export section 12. The product stripping device 15 is also controlled by the system computer, and the slide elements 16 and 17 that are also driven by a motor or hydraulically or pneumatically represent a rather simple and cheap as well as reliable way of realization thereof. There is to be noted that the level transport device EBG may also have a compartment floor vibration device or a compartment floor inclination device or a product stripping device, wherein dependent on the application, one of these possibilities may be rather advantageous.

Figure 5:
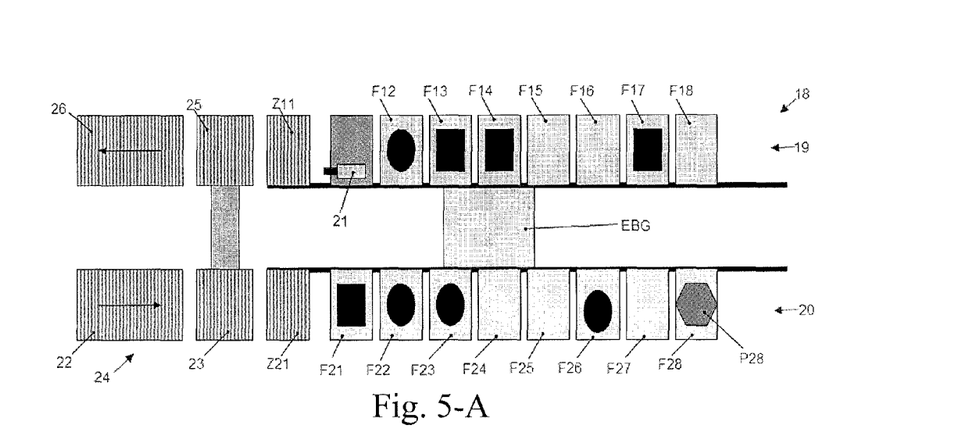
Figures 1, 5:
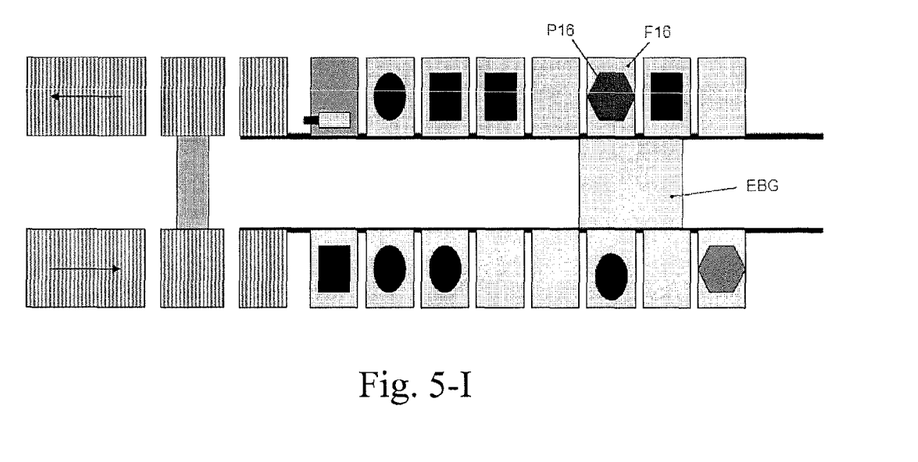

In the FIGS. 5-A to 5-R there is illustrated a storage system 18 according to a further exemplary embodiment of the invention in a schematic top view, wherein the individual process steps for storing and removing a product are visible. The storage system 18 has storage spaces L in seven levels in a first shelf 19 and a second shelf 20, wherein in FIG. 5 the lowest and thus first level is depicted. The second shelf 20 has in its first level eight storage spaces L21, L22 to L28, wherein representative for the respective storage space L there is designated only the respective compartment floor F21, F22 to F28. In the first shelf, there are provided only seven storage spaces L12 to L18 (F12 to F18 in FIG. 5-A designated) of the eight possible storage spaces L11 to L18 for storing the products P, as there is provided on the storage space L11 as well as on the storage spaces in the levels above the respective product stripping device 21. The products P are supplied via an import section 22 of a conveyor system 24 to the storage system 18 and there taken over by a first lift 23 of the storage system 18 for storing, and they are then transported off by means of a second lift 25 of the storage system 18 and via an export section 26 of the conveyor system 24. Intermediate buffers Z11 and Z21 are provided for a temporary storage of the products P that are discharged by the first lift 23 for temporary storage or of the products P to be supplied by the second lift 25. The level transport device EBG serves to convey the compartment floors F including products P between the storage spaces L and the intermediate buffers Z.

In the following, there is explained the method for storing a product P16 from the conveyor system 24 into the storage system 18 onto the free storage space L16 by way of the FIGS. 5-A to 5-I. According to the example, there is assumed that a trailer truck has delivered ten palettes, each containing a plurality of products packed in hexagonal boxes, to the palette storage, which now are to be individually stored in the storage system 18. In the system computer, each storage space L is assigned to a storage space in the computer memory, which is why the system computer knows what is stored on each storage space L of the storage system 18 or whether the storage space L is currently free. The system computer, hence, determines according to a manual input or according to a computer programme that one of the hexagonal boxes is to be stored on the empty compartment floor F16 of the storage space L16 according to FIG. 5-A and that this hexagonal box thus receives the code name product P16. In FIG. 5-B the product P16 is then supplied via the import section 22 and transferred to the first lift 23 in FIG. 5-C. As the product P16 is to be stored in the first level of the first shelf 19, it is thus not necessary for the first lift 23 to lift the product P16 onto another level, which is why the product P16 is moved into the intermediate buffer Z21 according to FIG. 5-D. In this way there is advantageously realized that the first lift 23 may take over already a further product P supplied via the import section 22 and convey this, for example, to the second level and the associated intermediate buffer Z22, while the level transport device EBG of the first level is still conveying the product P16 to the storage space L16. In this way, the throughput of the storage system 18 is substantially increased.

As depicted in FIG. 5-E, the level transport device EBG, controlled by the system computer, then moves to the storage space L16 and picks up the empty compartment floor F16. In FIG. 5-F the level transport device EBG pushes the compartment floor F16 underneath the product P16, which will be explained in greater detail in the following. According to FIG. 5-G the level transport device EBG pulls the compartment floor F16 by means of the integral connection onto the level transport device EBG and transports the compartment floor F16 to the storage space L16, as displayed in FIG. 5-H. In FIG. 5-I the level transport device EBG pushes the compartment floor F16 by means of the integral connection into the storage space L16, which constitutes the conclusion of the storing process of the product P16.

According to the exemplary embodiment there is assumed that the system computer processes an order and commissions the products necessary therefore—among others, the product P28. The system computer as a consequence controls the removal of the product P28 from the storage system 18 onto the conveyor system 24, by means of which the product P28 is to be conveyed to the commissioning unit. In the FIGS. 5-J to 5-R the method for removing a product P28 is described.

As illustrated in FIG. 5-J, the level transport device EBG moves to the storage space L28 in order to pull the compartment floor F28 including the product P28 onto the level transport device EBG according to FIG. 5-K. In FIG. 5-L the level transport device EBG conveys the compartment floor F28 to the intermediate buffer Z11 provided for removal and pushes, as illustrated in FIG. 5-M, the compartment floor F28 including the product P28 into the intermediate buffer Z11. As depicted in FIG. 5-N, a slide element 28 of the product stripping device 21 then extends, controlled by the system computer, and strips, as depicted in FIG. 5-O, the product P28 from the compartment floor F28, while the compartment floor F28 is being retracted onto the level transport device EBG. As depicted in 5-P, the product P28 is then situated on the transport rolls TR of the intermediate buffer Z11, and the compartment floor F28 is positioned on the level transport device EBG. As displayed in FIG. 5-Q, the level transport device EBG then conveys the compartment floor F28 back to the storage space L28. Once the second lift 25 is free and ready to convey the product P28, the product P28 will be conveyed via the transport rolls of the intermediate buffer Z11 onto the transport rolls of the second lift 25 and from there onto the transport rolls TR of the export section 26 of the conveyor system 24. According to FIG. 5-R, the removal of the product P28 from the storage system 18 is thus concluded.

As can be seen by way of the exemplary embodiment according to the FIGS. 5, the compartment floors F of the storage system 18 do not leave the respective level of the storage system 18 at any point of time during the process of storage or removal and, hence, advantageously do not negatively affect the conveyor capacity of the lifts 23 and 25. Due to the only "local" utilization of the compartment floors F in the storage system 1 and the superior control of the system computer it is not necessary that the compartment floors F have a special identification, such as, for example, a bar code or a so-called radio frequency identification tag. The compartment floors F are designed as identification-less compartment floors F, which may thus be produced with low costs. By provision of the first and the second lift 23 and 25 and a plurality of shelving levels, there is obtained the advantage that the shelves may store products P in a number of levels, which is why the ground area of the storage system 18 may be kept rather small. Because of the allocation that the import section 22 and the first lift 23 and the intermediate buffer Z21 may exclusively be used for storing the products P and the intermediate buffer Z11 and the second lift 25 and the export section 26 may be exclusively used for removing the products P, it is possible to prevent collisions and intersections, thus constituting an especially effective performance of the storage system 18. By provision of the transport rolls TR not only on the conveyor system 24 but also in the lifts 23 and 26 as well as the intermediate buffers Z11 and Z21, there is obtained the advantage of an especially easy and energy-saving transport of the compartment floors F. The advantages stated above in reference to the storage system 18 also apply to the storage system 1. There is to be noted that the individual steps of storing and removing in FIG. 5 are displayed only sequentially for a simpler explanation and that some of these steps may be carried out in parallel in the course of an actual realization in order to further increase the throughput of the storage system. There may be further noted that not every storage space L has to be provided with a compartment floor F. For example, the level transport device EBG could then return the empty compartment floor F not back to its original site, viewed from the intermediate buffer Z, at the other end of the shelf but rather store the empty compartment floor F in a nearer situated storage space L without compartment floor F. In this way, it is possible to increase the efficiency of the level transport devices EBG in a storage system that is not working to its capacity.

Figure 6:
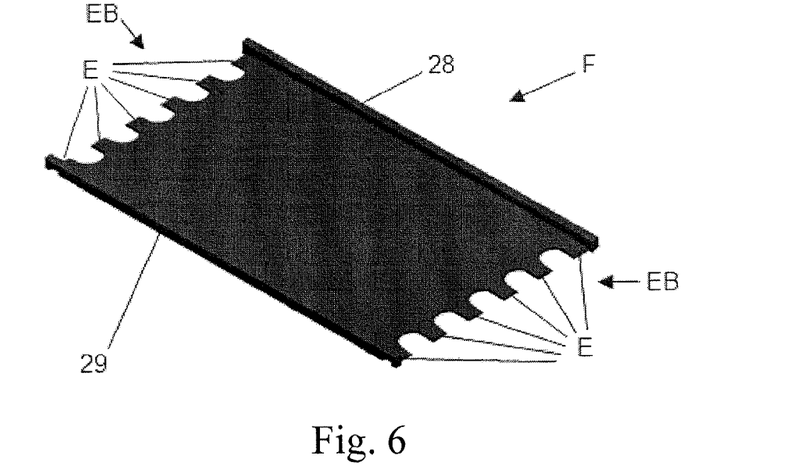
FIG. 6 shows a compartment floor of the storage system according to FIG. 1.

In FIG. 6 there is depicted a compartment floor F that may be used into the storage system 1 as well as in the storage system 18. The compartment floor F has at each of its longitudinal sides small walls 28 and 28 in order to make it difficult for a product P to fall of or slide off. At each of its narrow sides, the compartment floor F has semi-circular recesses EB, the diameter of which is selected slightly larger than the diameter of the transport rolls TR of the storage system and the conveyor system. The ends E of the recesses EB are inclined downwards and form chamfered appendices of the loading edges. If the compartment floor F comes to a halt on the transport rolls TR, the ends E engage the gaps of the transport rolls TR, whereupon the ends E move underneath the product P when a product P that is situated in the intermediate buffer Z is pushed forward. Thus there is obtained the advantage that the compartment floor F may be pushed underneath the product P with application of only a small amount of force and without the risk of getting entangled or blocked. In the compartment floor F depicted in FIG. 6 the recesses EB are provided at both narrow sides of the compartment floor F, having the advantage that the compartment floor F is symmetric and cannot come to a halt on the storage space or the level transport device EBG rotated 180°. In an especially low-cost variant, there may even be provided with recesses EB only one narrow side, namely the narrow side facing the storage spaces L and the intermediate buffer Z.

Figure 7:
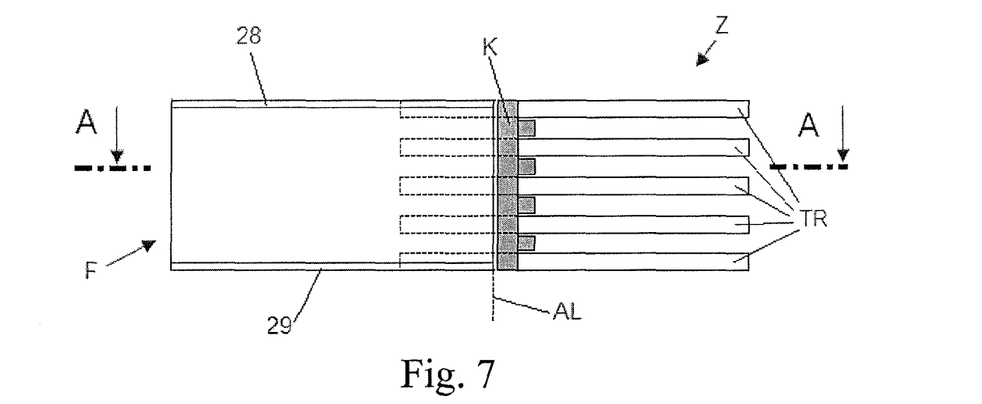
FIG. 7 shows a compartment floor including transport rolls according to a further exemplary embodiment in a top view.

In FIG. 7 there is displayed a compartment floor F according to another exemplary embodiment including transport rolls TR of an intermediate buffer Z and a wedge K in a top view, wherein the compartment floor F is displayed moved already partly into the intermediate buffer Z. The compartment floor F according to FIG. 7 has, as the compartment floor F according to FIG. 6, small walls 28 and 29 at the longitudinal side, wherein there are not provided any recesses EB. The intermediate buffer Z has on the side of the shelf the wedge K, to which the compartment floor F may dock to and which may be transferred together with the compartment floor F into the intermediate buffer Z and back. The wedge K has an upper surface that is chamfered downwards starting from the docking line AL, which pushes underneath the product P when the compartment floor F is pushed by the level transport device EBG into the intermediate buffer Z and, hence, slightly lifts the product P onto the compartment floor F.

Figure 8:
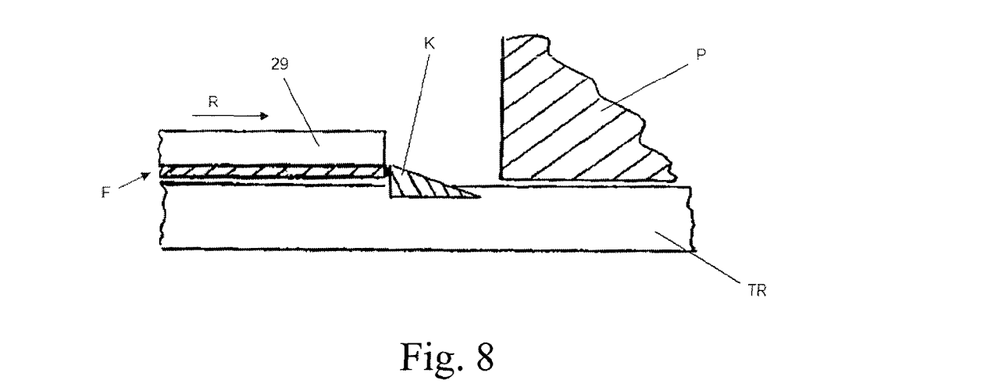
FIG. 8 shows the compartment floor including transport rolls according to FIG. 7 in a sectional view.

FIG. 8 shows a sectional view of the compartment floor F including the wedge K and the transport rolls TR alongside a sectional line A-A, wherein there is also displayed a product P situated in the intermediate buffer Z in a sectional view. As is clearly visible in FIG. 8, the wedge appendices of the wedge K slide between the transport rolls TR underneath the product P, when the level transport device EBG pushes the compartment floor F in the direction of arrow R. when the compartment floor F is then retracted, the wedge K is then pulled back into its original position. Thereby there is obtained the advantage that the compartment floor F does not require any recesses EB at the narrow side and thus has substantially lower production costs.

There is to be noted that in a storage system there may also be arranged the conveyor system at both sides of the shelves. In this case, the lifts and conveyor belts would be arranged at the narrow sides of the shelves, and the respective last storage space L of each shelf would, hence, be formed as a intermediate buffer. In this way, there could be obtained an even higher throughput by the storage system.

There is to be noted that the compartment floors may be produced from different materials. The number of the shelves and the number of the storage spaces in the individual shelves may be selected and enlarged in the storage system according to the invention as desired.

The invention claimed is:

1. A storage system with at least one shelving level, comprising at least one transport aisle, shelves situated alongside the transport aisle with storage spaces for products and a level transport device movable in the transport aisle for approaching the storage spaces, with a conveyor system for delivering products to the shelving level and removing products therefrom, with at least one intermediate buffer, in which the products supplied by means of the conveyor system are temporarily stored until their storage in a storage space and in which products that are removed from the storage places are temporarily stored until their transfer to the conveyor system, wherein substantially each storage space comprises a movable compartment floor and the level transport device comprises compartment floor-moving means, by means of which a compartment floor may be transferred from the storage space into the level transport device and vice versa and from the level transport device into the intermediate buffer and vice versa so that the compartment floor does not pass onto the conveyor system; and wherein intermediate buffers are arranged at opposite sides of the transport aisle and/or at opposite end regions of the transport aisle, and wherein at least one intermediate buffer is provided only for removing the products and at least another intermediate buffer is provided only for storing the products.

2. A storage system according to claim 1, wherein the compartment floors are provided at the sides facing the storage places and the intermediate buffers with loading edges inclined downwards or chamfered.

3. A storage system according to claim 1, wherein there is arranged a wedge at the at least one intermediate buffer on the side of a shelf, to which there may be docked a compartment floor and which may be transferred together with the compartment floor into the intermediate buffer and back, wherein the wedge has an upper surface that is chamfered downwards starting from the docking line with the compartment floor.

4. A storage system according to claim 1, wherein the at least one intermediate buffer for removing the products (P), has a product stripping device comprising one of a retainer or a slide element.

5. A storage system according to claim 1, wherein the level transport device has a compartment floor vibration device, a compartment floor inclination device or a product discharge device.

6. A storage system according to claim 1, characterized by several shelving levels.

7. A storage system according to claim 6, wherein the conveyor system comprises at least one lift for supplying products to the shelving levels and removing therefrom, and wherein there are optionally arranged lifts at the opposite ends of the transport aisle.

8. A storage system according to claim 7, wherein there is provided at least one lift for supplying products to the shelving levels and at least one lift for removing the products from the shelving levels.

9. A storage system according to claim 8, wherein the at least one intermediate buffer and/or optionally the at least one lift have transport elements.

10. A storage system according to claim 1, wherein the compartment floors are formed as identification-less compartment floors.

11. A storage system with at least one shelving level, comprising at least one transport aisle, shelves situated alongside the transport aisle with storage spaces for products and a level transport device movable in the transport aisle for approaching the storage spaces, with a conveyor system for delivering products to the shelving level and removing products therefrom, with at least one intermediate buffer, in which the products supplied by means of the conveyor system are temporarily stored until their storage in a storage space and in which products that are removed from the storage places are temporarily stored until their transfer to the conveyor system, wherein substantially each storage space comprises a movable compartment floor and the level transport device comprises compartment floor-moving means, by means of which a compartment floor may be transferred from the storage space into the level transport device and vice versa and from the level transport device into the intermediate buffer and vice versa so that the compartment floor does not pass onto the conveyor system; and wherein the compartment floors are provided at the sides facing the storage places and the intermediate buffers with loading edges inclined downwards or chamfered.

12. A storage system according to claim 11, wherein the loading edges have appendices that may be introduced between the transport elements of the intermediate buffer.

13. A storage system according to claim 12, wherein the transport elements are transport rolls.

14. A storage system with at least one shelving level, comprising at least one transport aisle, shelves situated alongside the transport aisle with storage spaces for products and a level transport device movable in the transport aisle for approaching the storage spaces, with a conveyor system for delivering products to the shelving level and removing products therefrom, with at least one intermediate buffer, in which the products supplied by means of the conveyor system are temporarily stored until their storage in a storage space and in which products that are removed from the storage places are temporarily stored until their transfer to the conveyor system, wherein substantially each storage space comprises a movable compartment floor and the level transport device comprises compartment floor-moving means, by means of which a compartment floor may be transferred from the storage space into the level transport device and vice versa and from the level transport device into the intermediate buffer and vice versa so that the compartment floor does not pass onto the conveyor system; and
  wherein a wedge is arranged at the at least one intermediate buffer on the side of a shelf, to which there may be docked a compartment floor and which may be transferred together with the compartment floor into the intermediate buffer and back, wherein the wedge as an upper surface that is chamfered downwards starting from the docking line with the compartment floor.

15. A storage system according to claim 14, wherein the wedge has appendices that may be introduced between transport elements of the intermediate buffer.

16. A storage system according to claim 15, wherein the transport elements are transport rolls.

17. A storage system according to claim 9, wherein the transport elements are transport rolls.

18. A storage system with at least one shelving level, comprising at least one transport aisle, shelves situated alongside the transport aisle with storage spaces for products and a level transport device movable in the transport aisle for approaching the storage spaces, with a conveyor system for delivering products to the shelving level and removing products therefrom, with at least one intermediate buffer, in which the products supplied by means of the conveyor system are temporarily stored until their storage in a storage space and in which products that are removed from the storage places are temporarily stored until their transfer to the conveyor system, wherein substantially each storage space comprises a movable compartment floor and the level transport device comprises compartment floor-moving means, by means of which a compartment floor may be transferred from the storage space into the level transport device and vice versa and from the level transport device into the intermediate buffer and vice versa so that the compartment floor does not pass onto the conveyor system; and
  wherein at least one intermediate buffer has a product stripping device comprising one of a retainer or a slide element.

19. A storage system with at least one shelving level, comprising at least one transport aisle, shelves situated alongside the transport aisle with storage spaces for products and a level transport device movable in the transport aisle for approaching the storage spaces, with a conveyor system for delivering products to the shelving level and removing products therefrom, with at least one intermediate buffer, in which the products supplied by means of the conveyor system are temporarily stored until their storage in a storage space and in which products that are removed from the storage places are temporarily stored until their transfer to the conveyor system, wherein substantially each storage space comprises a movable compartment floor and the level transport device comprises compartment floor-moving means, by means of which a compartment floor may be transferred from the storage space into the level transport device and vice versa and from the level transport device into the intermediate buffer and vice versa so that the compartment floor does not pass onto the conveyor system; and
  wherein there is provided at least one lift for supplying products to the shelving levels and least one lift for removing the products from the shelving levels.

\* \* \* \* \*